US012705150B2

(12) United States Patent
Li et al.

(10) Patent No.: US 12,705,150 B2
(45) Date of Patent: Aug. 11, 2026

(54) HANDLING PROGRAM FAILURE IN ZONE MEMORY SYSTEM

(71) Applicant: Micron Technology, Inc., Boise, ID (US)

(72) Inventors: Juane Li, Milpitas, CA (US); Amit Bhardwaj, Longmont, CO (US); Michael Winterfeld, Firestone, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/788,460

(22) Filed: Jul. 30, 2024

(65) Prior Publication Data

US 2026/0037399 A1 Feb. 5, 2026

(51) Int. Cl.

| | |
|---|---|
| ***G06F 11/00*** | (2006.01) |
| ***G06F 3/06*** | (2006.01) |
| ***G06F 11/20*** | (2006.01) |

(52) U.S. Cl.

CPC ........ *G06F 11/2092* (2013.01); *G06F 3/0619* (2013.01); *G06F 3/064* (2013.01); *G06F 3/0647* (2013.01); *G06F 3/0683* (2013.01); *G06F 2201/805* (2013.01)

(58) Field of Classification Search

CPC .... G06F 11/2092; G06F 3/0619; G06F 3/064; G06F 3/0647; G06F 3/0683; G06F 2201/805

See application file for complete search history.

(56) References Cited

U.S. PATENT DOCUMENTS

| | | | |
|---|---|---|---|
| 2017/0169034 A1 | 6/2017 | Shrivastava et al. | |
| 2019/0332544 A1 | 10/2019 | Jia et al. | |
| 2022/0139466 A1 | 5/2022 | Gorobets et al. | |
| 2022/0319622 A1* | 10/2022 | Bhardwaj ............ | G06F 3/0679 |
| 2024/0061597 A1 | 2/2024 | Lam et al. | |
| 2024/0143170 A1 | 5/2024 | Lakshmi et al. | |
| 2024/0220359 A1* | 7/2024 | Inbar .................... | G06F 11/076 |
| 2026/0037140 A1 | 2/2026 | Li et al. | |
| 2026/0037369 A1 | 2/2026 | Li et al. | |

FOREIGN PATENT DOCUMENTS

| | | |
|---|---|---|
| CN | 101356510 A | 1/2009 |

* cited by examiner

*Primary Examiner* — Jason B Bryan

(74) *Attorney, Agent, or Firm* — Schwegman Lundberg & Woessner, P.A.

(57) ABSTRACT

Various embodiments provide handling block program failure in a memory sub-system that supports zones. In particular, some embodiments described herein handle block program failure during a data write (e.g., host data write) to a cache block of a zone on a memory device on a memory sub-system, block program failure during refresh of a cache block of a zone on a memory device on a memory sub-system, block program failure during migration of data between a cache block and a non-cache block of a zone on a memory device on a memory sub-system, block program failure during refresh of a non-cache block of a zone on a memory device on a memory sub-system, or some combination thereof.

20 Claims, 10 Drawing Sheets

HANDLING PROGRAM FAILURE IN ZONE MEMORY SYSTEM

TECHNICAL FIELD

Embodiments of the disclosure relate generally to memory devices and, more specifically, to handling block program failure in a memory system or sub-system that supports zones.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
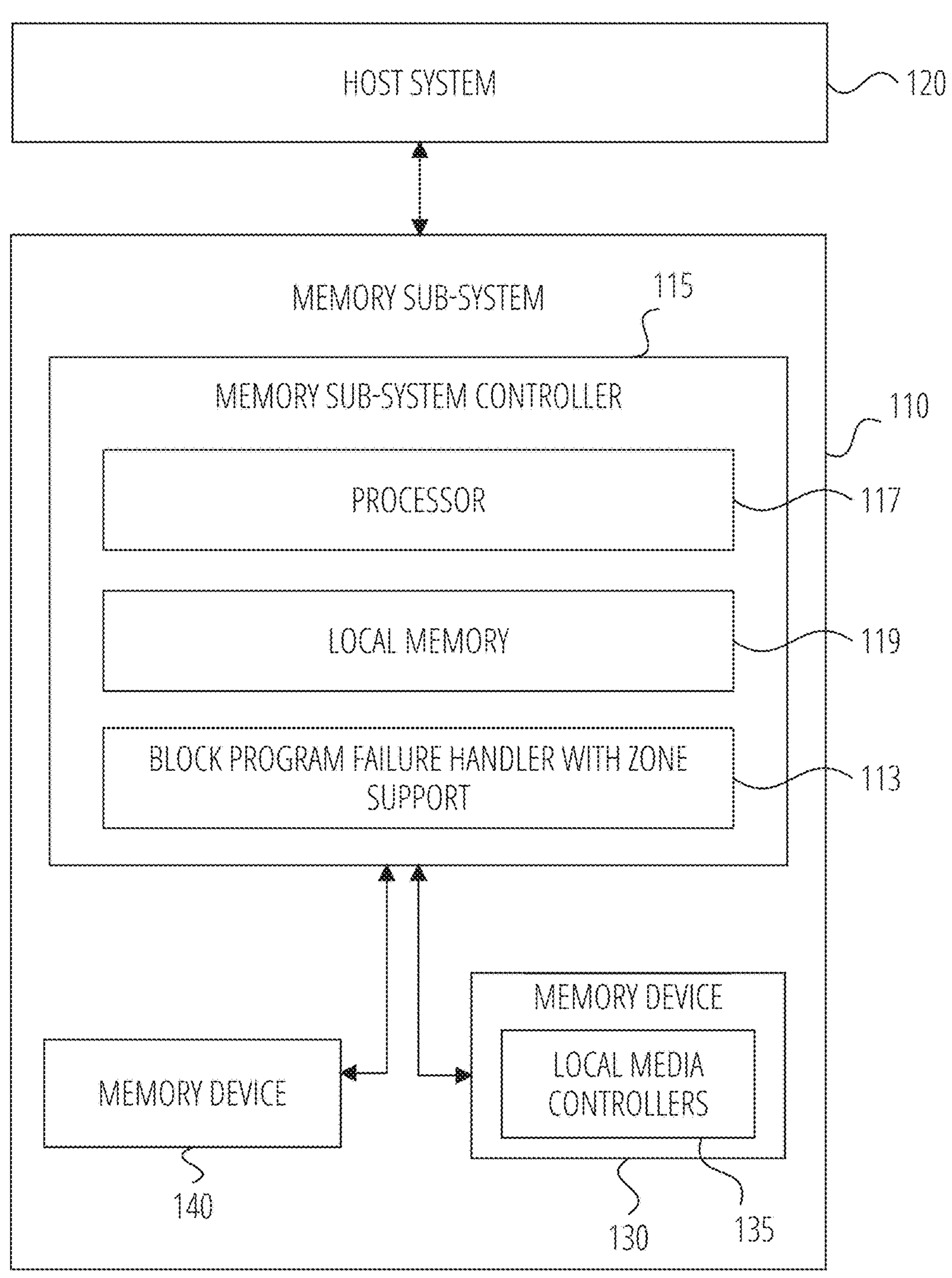
FIG. 1 is a block diagram illustrating an example computing system that includes a memory sub-system, in accordance with some embodiments of the present disclosure.

Aspects of the present disclosure are directed to handling block program failure in a memory sub-system that supports zones (hereafter, a zone memory sub-system). A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

The data can be stored in the memory sub-system according to zones. Such a memory sub-system can be referred to as a zone-based memory sub-system or a zone memory sub-system. As used herein, a zone can comprise a contiguous range of logical addresses (e.g., logical block addresses) that is managed within a memory sub-system as a single unit. In comparison to block level data management, a zone-based memory sub-system can use zones to organize and manage data as larger, logically contiguous memory regions, which can allow for more efficient use of storage space on the memory sub-system and reduce write amplification of blocks. Each zone can be managed independently and have an associated state machine maintained by the memory sub-system. The state machine of an individual zone can comprise a set of states for the individual zone, where each state in the set of states (e.g., in combination with and a zone type of the individual zone) can define operational characteristics of the individual zone. Example zone states for an individual zone can include, without limitation: empty (e.g., ZSE: Empty); implicitly opened (e.g., ZSIO: Implicitly Opened); explicitly opened (e.g., ZSEO: Explicitly Opened); closed (e.g., ZSC: Closed); full (e.g., ZSF: Full); read only (e.g., ZSRO: Read Only); or offline (e.g., ZSO: Offline). Various zones can be defined in the memory sub-system, each of which can be uniquely associated with a particular set of user data or an application. For example, a first zone can be associated with a first application (or user data identified as received from the first application) and a second zone can be associated with a second application. Host data or user data received from the first application can be stored by the memory sub-system in the first zone. The zones can be of equal or unequal size and can span the size of a single block on a die, multiple blocks on the die, an entire die or a set of dies of the memory sub-system. For example, each zone can span a respective set of blocks in a corresponding die or set of die rather than sequentially across a row of blocks, and a particular application can be associated with a given zone that spans a single die. User or host data associated with that application can be stored in that given zone on the single die. A zone can be defined in a memory sub-system in accordance with a NVM EXPRESS (NVMe) specification (e.g., Zone Namespaces (ZNS) specification from NVMe). For instance, a zone can be defined in a memory sub-system by one or more NVMe commands issued to the memory sub-system.

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more dies. Each die can be comprised of one or more planes. For some types of non-volatile memory devices (e.g., AND-type devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application data.

Certain memory devices, such as NAND-type memory devices, comprise one or more blocks, (e.g., multiple blocks), with each of those blocks comprising multiple memory cells. For instance, a memory device can comprise multiple pages (also referred to as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

A memory device can comprise one or more cache blocks and one or more non-cache blocks, where data written to the memory device is first written to one or more cache blocks, which can facilitate faster write performance; and data stored on the cache blocks can eventually be moved (e.g., copied) to one or more non-cache blocks at another time (e.g., a time when the memory device is idle), which can facilitate higher storage capacity on the memory device. A cache block can comprise a single-level cell (SLC) block that comprises multiple SLCs, and a non-cache block can comprise a multiple-layer cell (MLC) block that comprises multiple MLCs, a triple-layer cell (TLC) block that comprises multiple TLCs, or a quad-level cell (QLC) block that comprises QLCs. Writing first to one or more SLCs blocks can be referred to as SLC write caching or SLC caching (also referred to as buffering in SLC mode). Generally, when using traditional full SLC caching, an SLC block is released of data after data is moved from the SLC block to a non-cache block (e.g., QLC block) and the non-cache block is verified to be free of errors.

Conventional zone memory sub-systems can use full SLC-block caching (also referred to as SLC caching), where data is buffered (e.g., written first) on SLC cache blocks and the buffered data is released from the SLC cache block after the buffered data is written to non-cache blocks (e.g., MLC, TLC, QLC blocks) and the written data is verified to be free of defects on the non-cache blocks. In some implementations where the non-cache blocks are QLC blocks, four SLC blocks could be utilized per an open QLC block. For instance, where a memory sub-system has sixteen open QLC blocks per NAND-device plane, sixty-four SLC cache blocks would be used per a plane.

Figure 2A:
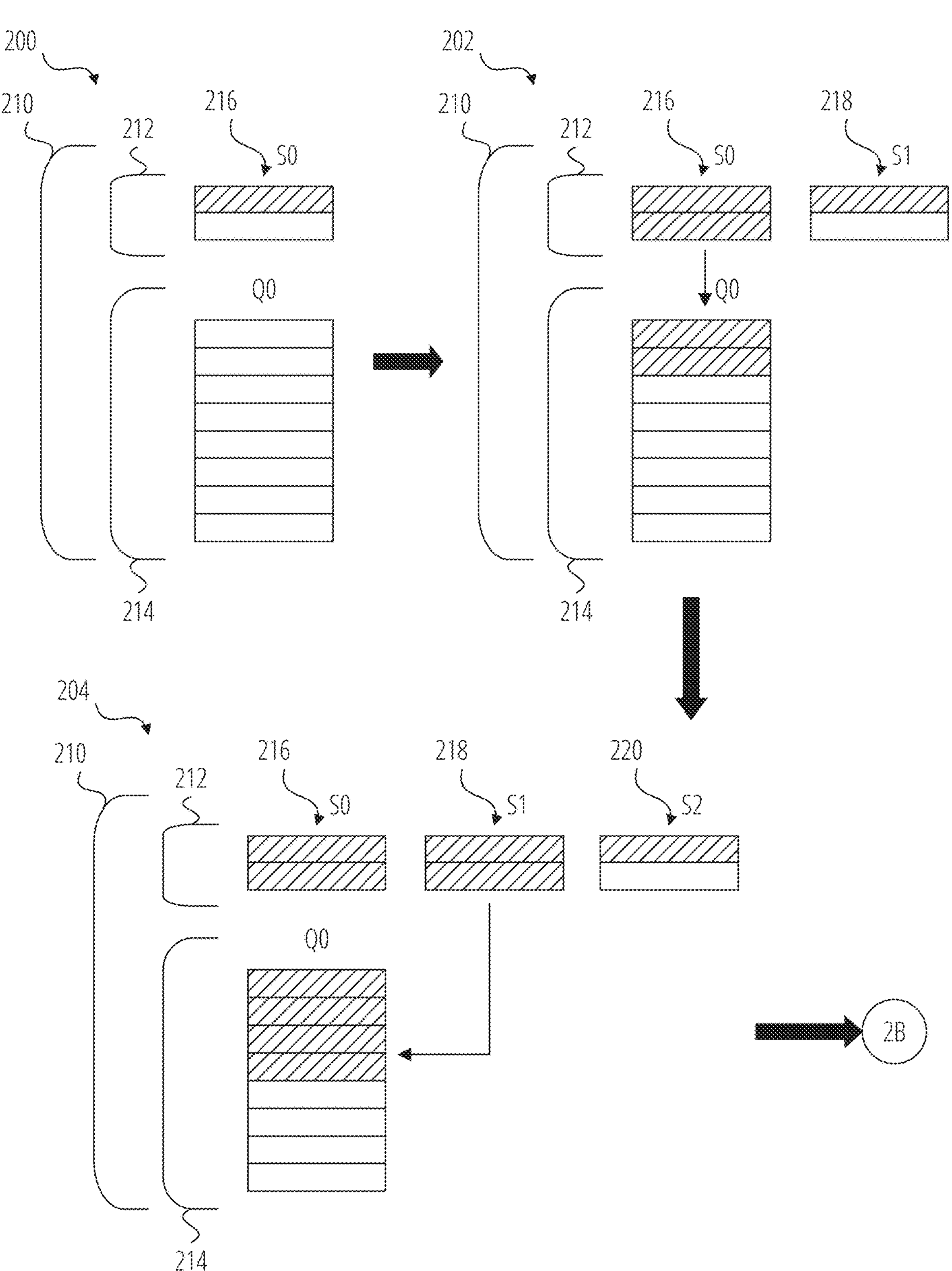
FIG. 2A and FIG. 2B are block diagrams illustrating operations of an example block caching architecture on a zone-based memory sub-system, in accordance with some embodiments of the present disclosure.
Figure 2B:
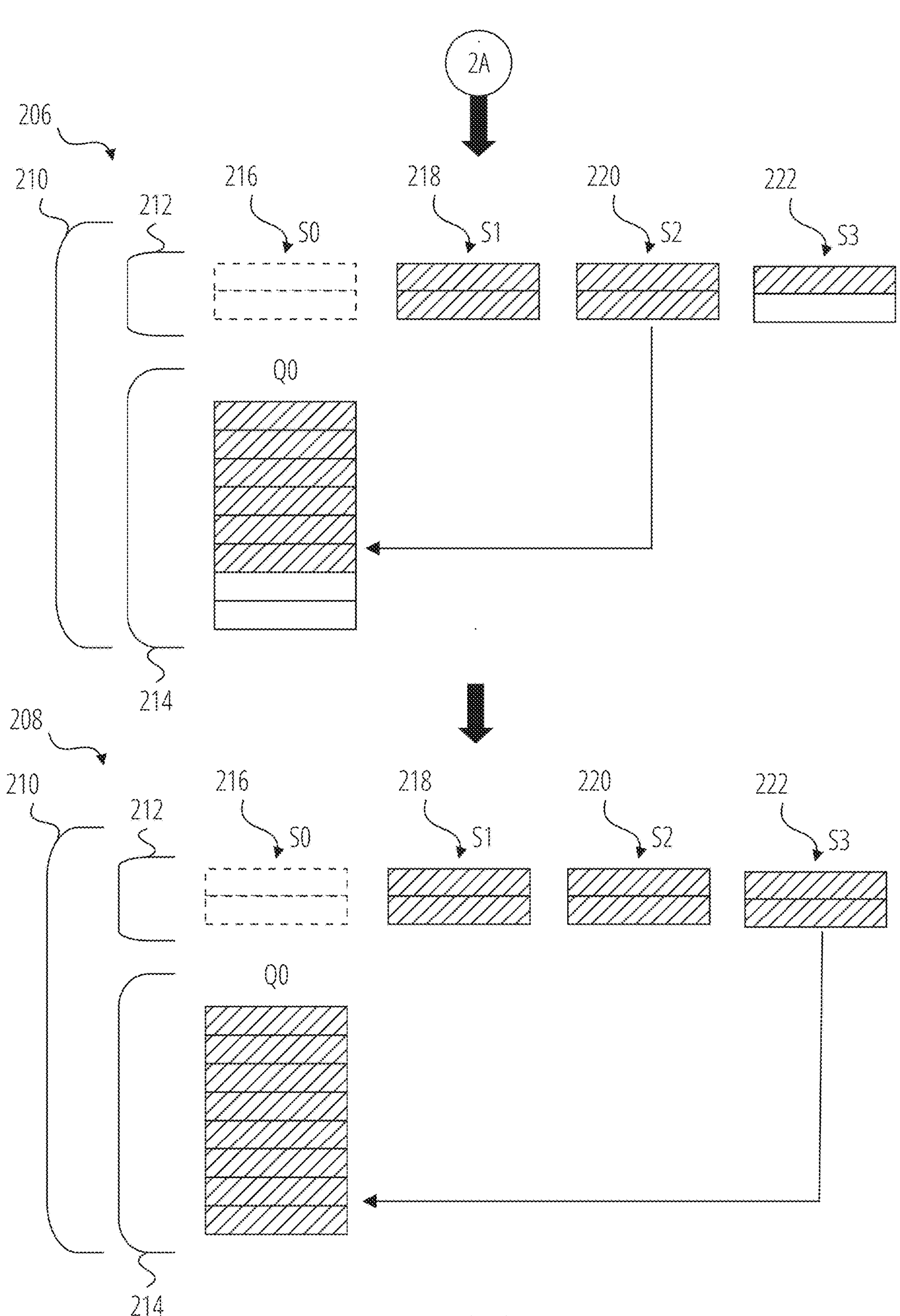

For a 3SLC/1QLC (or 3S/1Q) architecture implemented on a zone-based memory sub-system, a single QLC blockset (e.g., comprising two QLC blocks) is mapped to a zone and up to three SLC blocksets are temporarily mapped to the zone to facilitate SLC-block caching with respect to the single QLC blockset. Operations of an example block caching architecture (e.g., 3S/1Q architecture) are illustrated with respect to FIG. 2A and FIG. 2B. In FIG. 2A and FIG. 2B, a zone 210 comprises one or more SLC blocksets 212 and a QLC blockset 214 (Q0). Referring now to FIG. 2A, when the zone 210 is open, a single, first SLC blockset 216 (S0) is allocated and mapped to the zone 210, and the QLC blockset 214 is allocated and mapped to the 210. During stage 200, as a host system starts writing data to the zone 210, data is buffered in the first SLC blockset 216 of the one or more SLC blocksets 212 and not written (copied back) to the QLC blockset 214 until there is enough data in the first SLC blockset 216. At stage 202, as the host system continues to write data to the zone 210 and the first SLC blockset 216 becomes full, a second SLC blockset 218 (S1) is allocated and mapped to the zone 210, data begins to be written to the second SLC blockset 218, and data stored (e.g., cached) in the first SLC blockset 216 is written (or copied back) to the QLC blockset 214. The first SLC blockset 216 is not released (e.g., unmapped or disassociated) from the zone 210 during stage 202. Thereafter at stage 204, as the host system continues to write data to the zone 210 and the second SLC blockset 218 becomes full, a third SLC blockset 220 (S2) is allocated and mapped to the zone 210, data begins to be written to the third SLC blockset 220, and data stored (e.g., cached) in the second SLC blockset 218 is written (or copied back) to the QLC blockset 214. The second SLC blockset 218 is not released (e.g., unmapped or disassociated) from the zone 210 during stage 204.

Referring now to FIG. 2B, at stage 206, as the host system continues to write data to the zone 210 and the fourth SLC blockset 222 becomes full, a fourth SLC blockset 222 (S3) is allocated and mapped to the zone 210, data begins to be written to the fourth SLC blockset 222, and data stored (e.g., cached) in the third SLC blockset 220 is written (or copied back) to the QLC blockset 214. If during stage 206, the fourth SLC blockset 222 is filled to a certain percentage, a read verify operation is performed on at least a portion (e.g., ¼) of the QLC blockset 214 to which data from the first SLC blockset 216 was written (e.g., copied back). During a read verify operation on a block, data is read from a block (e.g., page thereof) and considered verified if the read data (e.g., read page data) can be successfully decoded. If the read verify operation performed on at least the portion (e.g., ¼) of the QLC blockset 214 results in a successful verification, the first SLC blockset 216 can be released (e.g., unmapped or disssociated) from the zone 210 (as shown in stage 206), thereby enabling the first SLC blockset 216 to be reallocated for reuse (e.g., different use). If, however, the read verify operation performed on at least the portion (e.g., ¼) of the QLC blockset 214 does not result in a successful verification, the first SLC blockset 216 is not released (e.g., unmapped or disassociated) from the zone 210 and a memory sub-system would need to handle the error of the unsuccessful verification to ensure data integrity of the zone 210.

During stage 208, as the host system continues to write data to the zone 210 and the fourth SLC blockset 222 becomes full, data stored (e.g., cached) in the fourth SLC blockset 222 is written (or copied back) to the QLC blockset 214. Additionally, during stage 208, a read verify operation is performed on remaining portions (e.g., ¾) of the QLC blockset 214 to which data from the second SLC blockset 218, the third SLC blockset 220, and the fourth SLC blockset 222 was written (e.g., copied back). If the read verify operation performed on the remaining portions (e.g., ¾) of the QLC blockset 214 results in a successful verification, the second SLC blockset 218, the third SLC blockset 220, and the fourth SLC blockset 222 can be released (e.g., unmapped or disassociated) from the zone 210 (as shown in stage 206), thereby enabling each of the second SLC blockset 218, the third SLC blockset 220, and the fourth SLC blockset 222 to be reallocated for reuse (e.g., different use). If, however, the read verify operation performed on the remaining portions (e.g., ¾) of the QLC blockset 214 does not result in a successful verification, the second SLC blockset 218, the third SLC blockset 220, and the fourth SLC blockset 222 are not released (e.g., unmapped or disassociated) from the zone 210 and a memory sub-system would need to handle the error of the unsuccessful verification(s) to ensure data integrity of the zone 210.

While the 3S/1Q architecture and similar architectures, such as 6SLC/2QLC (or 6S/1Q), offer a balanced approach to data performance and storage efficiency on a memory sub-system, it introduces complexities in data management, especially during the migration phases. Handling programming and reading of cache and non-cache blocks effectively is crucial, as failures in these operations can lead to data loss or corruption. For example, when programming of a SLC cache block fails, it affects the zone to which the SLC cache block is mapped and the memory sub-system would need to handle the failure to ensure zone data integrity. In another example, program failure can happen while data is written (e.g., copied back) from a SLC cache block mapped to a zone to a QLC block mapped to the zone, or while data is written from a QLC block mapped to a first zone to a QLC block mapped to a second zone. When programming of a QLC block fails, it affects the zone to which the QLC block is mapped and the memory sub-system would need to handle the failure to ensure zone data integrity.

Various embodiments described herein provide for handling block program failure in a memory sub-system that supports zones. In particular, some embodiments described herein handle block program failure during a data write (e.g., host data write) to a cache block of a zone on a memory device on a memory sub-system, block program failure during refresh of a cache block of a zone on a memory device on a memory sub-system, block program failure during migration of data between a cache block and a non-cache block of a zone on a memory device on a memory sub-system, block program failure during refresh of a non-cache block of a zone on a memory device on a memory sub-system, or some combination thereof.

The memory sub-system of some embodiments provides enhanced data integrity (e.g., by swiftly handling program failures and ensuring data is not lost or corrupted), reduced downtime (e.g., quick recovery from program failures, thereby enhancing overall reliability and user experience), and optimized resource utilization (e.g., efficient management of cache and non-cache blocksets can ensure optimal use of memory resources, balancing performance with cost). The memory sub-system of some embodiments can enhance data integrity and system reliability (e.g., in solid-state drives (SSDs)) using a zone architecture (e.g., ZNS architecture), such as 3S/1Q architecture or the like. Additionally, the memory sub-system of some embodiments can incorporate advanced mechanisms for handling program failures in both cache and non-cache blocksets, ensuring robust data management and recovery processes. Specifically, the memory sub-system of some embodiments is structured around the use of SLC cache blocks and QLC non-cache blocks, organized into zones, where zone data integrity on program failure (e.g., during the SLC→QLC and QLC→QLC data movement) can be maintained, which can cover program failure during host data write and SLC or QLC refresh (e.g., during a wear leveling process, a garbage collection process, a media scan process, a read disturb process, or another background process). Each zone can be mapped to specific blocksets, with multiple SLC blocksets of a single zone serving as a high-speed cache and a single QLC blocksets of the single zone being used for long-term data storage. This configuration can leverage the fast data access and data write capabilities of SLC blocks while benefiting from the high-density data storage and cost-effectiveness of QLC blocks.

According to some embodiments, cache (e.g., SLC cache) program failure handling by a system (e.g., memory sub-system) comprises performing one or more of the following operations when a program failure is detected in a select cache (e.g., SLC cache) blockset during host data write operations. The affected zone can be immediately finished by a controller (e.g., memory sub-system controller). A new cache (e.g., SLC cache) blockset can be allocated, and can be allocated on the same planeset as the select cache block set if possible. Data from the failed cache blockset, including any data still in buffer memory, is migrated to the new cache (e.g., SLC cache) blockset. The system can ensure that all written data in the failed cache blockset is transferred to the new cache blockset before any read verification on the corresponding non-cache (e.g., QLC non-cache) blockset is completed. The failed cache blockset can be marked as a bad block (e.g., Grown Bad Block (GBB)) and retired. The system can check for cache capacity shortages that could trigger a planeset retirement.

According to various embodiments, non-cache (e.g., QLC non-cache) program failure handling by a system (e.g., memory sub-system) comprises performing one or more of the following operations when a program failure is detected during a cache-to-non-cache data migration (e.g., copyback) process involving a select non-cache blockset. The affected zone can be moved to a read-only state to prevent further write operations on the affected zone. A new non-cache blockset can be allocated, and can be allocated on the same planeset as the select non-cache blockset if possible. The system can initiate a refresh of the error-affected non-cache block and restart the cache-to-non-cache migration using the new blockset. The failed non-cache blockset can be marked as bad (e.g., GBB) and retired. Additionally, an empty zone can be taken offline to compensate for the capacity loss due to the retirement of the failed non-cache blockset.

While various embodiments are described herein with respect to a 3S/1Q architecture, various embodiments can be adapted to be implemented with respect to other (e.g., similar) architectures, such as a 6S/1Q architecture.

As used herein, a planeset can comprise two or more planes of a memory die (e.g., NAND-type memory die), which can be part of a memory device (e.g., a NAND-type memory device). For instance, a planset0 can comprise plane0 and plane1 of a memory die, and a planset1 can comprise plane 2 and plane 3 of the memory die. A blockset can comprise one or more blocks of a memory device (e.g., a NAND-type memory device). For example, a blockset can comprise multiple blocks of a memory device (e.g., a NAND-type memory device) from different planesets (e.g., two blocks-one block from planeset0 and another block from planeset1). A SLC blockset can comprise one or more SLC blocks of a memory device (e.g., a NAND-type memory device), and a QLC blockset can comprise one or more QLC blocks of a memory device (e.g., a NAND-type memory device) of a memory sub-system. One or more SLC blocksets can be used for SLC caching on a memory device (e.g., a NAND-type memory device) of a memory sub-system.

As used herein, an erase status failure (ESF) can refer to a failure to erase a block (e.g., SLC block) on a memory device (e.g., a NAND-type memory device). A program status failure (PSF) or program failure (PF) can refer to a failure to program a block (e.g., SLC block) on a memory device (e.g., a NAND-type memory device) with data (e.g., write data to the NAND-type memory device). A grown bad block (GBB) can refer to a block of a memory device (e.g., a NAND-type memory device) that is marked as bad (e.g., unusable or unavailable) during operation of the memory device. An uncorrectable error (UECC) can refer to an error when reading data from a block of a memory device (e.g., a NAND-type memory device), where the error cannot be corrected by an error correction mechanism (e.g., error correction parity).

As used herein, a zone can comprise a contiguous range of logical addresses (e.g., logical block addresses) that is managed within a memory sub-system as a single unit. For example, a zone can be mapped to one or more blocksets. Once a zone is marked as finished by a controller (e.g., marked as zone finished by controller (ZFC)), the controller of a memory sub-system can prevent data from being written to the zone, but does not prevent data from being read from, the zone.

Disclosed herein are some examples of handling block program failure in a memory sub-system that supports zones, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM EXPRESS (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LB A, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a block program failure handler with zone support 113 (hereafter, the block program failure handler 113) that enables or facilitates block program failure handling with respect to zones of the memory sub-system 110 in accordance with various embodiments described herein. Alternatively, some or all of the block program failure handler 113 is included by the local media controller 135, thereby enabling the local media controller 135 to enable or facilitate block program failure handling with respect to zones of the memory sub-system 110.

As described herein, FIG. 2A and FIG. 2B are block diagrams illustrating operations of an example block caching architecture (e.g., 3S/1Q architecture) on a zone-based memory sub-system, in accordance with some embodiments of the present disclosure.

FIG. 3 through FIG. 8 are flow diagrams of example methods 300, 400, 500, 700, 800 of handling block program failure on a memory sub-system that supports zones, in accordance with some embodiments of the present disclosure. Any of methods 300, 400, 500, 700, 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, any one of methods 300, 400, 500, 700, 800 is performed by the memory sub-system controller 115 of FIG. 1 based on the block program failure handler 113. Additionally, or alternatively, for some embodiments, any one of methods 300, 400, 500, 700, 800 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 3:
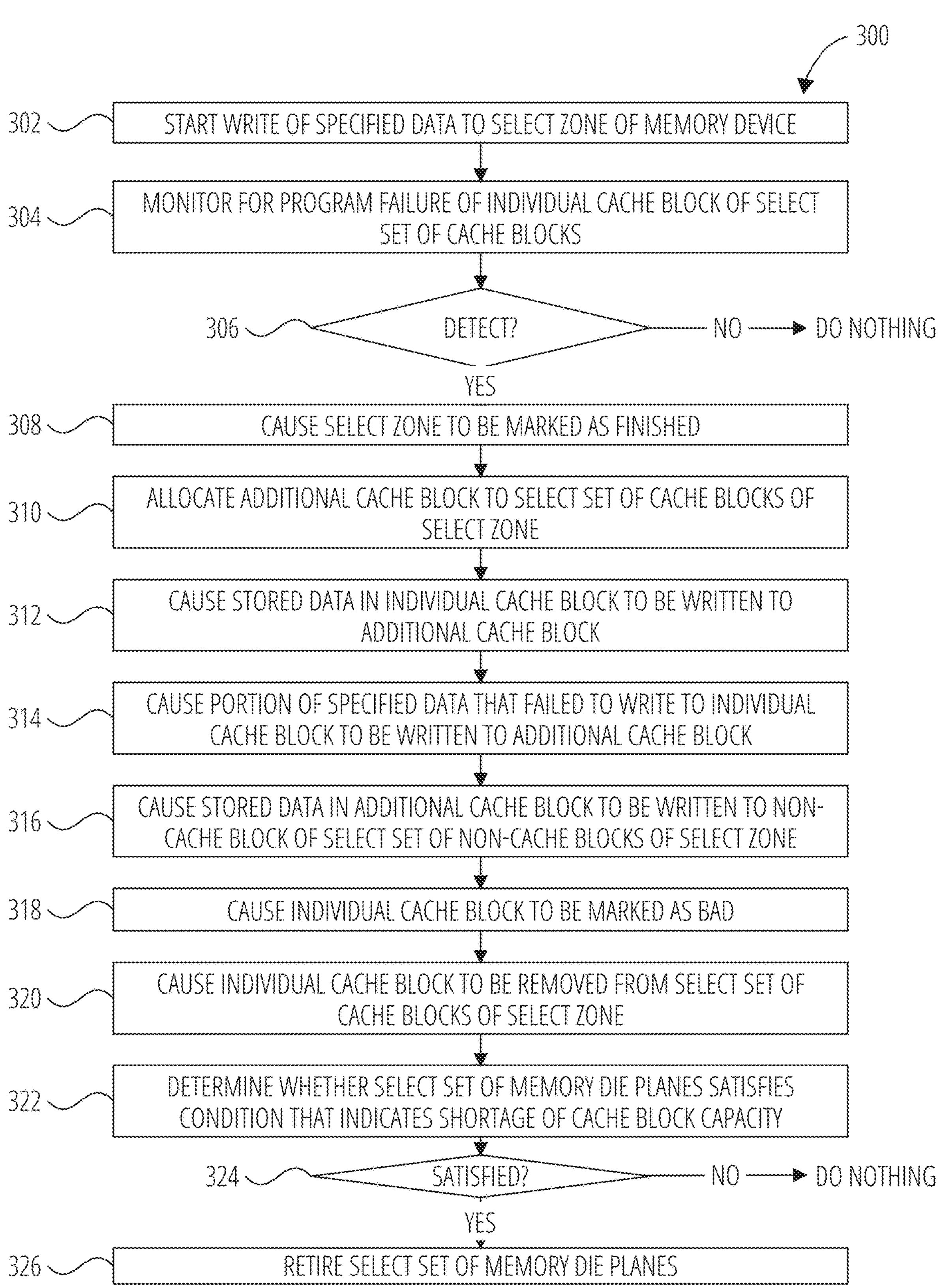
FIG. 3 through FIG. 8 are flow diagrams of example methods for handling block program failure on a memory sub-system that supports zones, in accordance with some embodiments of the present disclosure.

Referring now to FIG. 3, the method 300 illustrates an example method for handling block program failure during a data write (e.g., host data write) to a cache block (e.g., SLC cache block) of a zone on a memory sub-system that supports zones. At operation 302, a processing device (e.g., the processor 117 of the memory sub-system controller 115) starts write of specified data to a memory device (e.g., memory device 130) of the memory sub-system. For various embodiments, the memory device comprises a set of zones for storing data, and a select zone of the set of zones comprises a select set of cache blocks and a select set of non-cache blocks. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to a NVMe specification. Additionally, the specified data can comprise at least a portion of host data that a host system (e.g., the host system 120) has requested be written to the memory sub-system (e.g., memory sub-system 110).

While the specified data is being written to the select zone, at operation 304, the processing device (e.g., the processor 117 of the memory sub-system controller 115) monitors (e.g., detects) for a program failure (e.g., program failure (PF) status) of an individual cache block of the select set of cache blocks of the select zone. At decision block 306, in response to the program failure being detected by operation 304, the method 300 proceeds to operation 308. Alternatively, at decision block 306, in response to the program failure not being detected by operation 304, the method 300 does nothing and the writing of the specified data to the select zone is assumed to have been completed without program failure.

At operation 308, the processing device (e.g., the processor 117 of the memory sub-system controller 115) causes the select zone to be marked as finished. In doing so, a memory sub-system can prevent data from being written to the select zone. At operation 310, the processing device allocates a new, additional cache block to the select set of cache blocks of the select zone. Where individual cache block is allocated from a select set of memory die planes of the memory device, the additional cache block can be allocated from the same select set of memory die planes. Then, at operation 312, the processing device causes stored data in the individual cache block to be written to the additional cache block (allocated by operation 310). By operation 312, all written data in the individual block is migrated to the (new) additional block in case the read-verify on the non-cache block has not been completed yet. According to some embodiments, operation 312 comprises determining whether a refresh process is being performed on at least one cache block of the select set of cache blocks and, in response to determining that the refresh process is being performed, causing the refresh process to stop (e.g., prior to causing the stored data in the individual cache block to be written to the additional cache block). Additionally, for some embodiments, operation 312 comprises determining whether a data migration is being performed from at least one cache block of the select set of cache blocks to at least one non-cache block of the select set of non-cache blocks and, in response to determining that the data migration is being performed, causing the data migration to stop (e.g., prior to causing the stored data in the individual cache block to be written to the additional cache block). Eventually, the processing device can cause stored data in the individual cache block to be written to the additional cache block by sending (e.g., issuing) one or more commands to the memory device to facilitate the writing of the stored data to the additional cache block. For operation 314, the processing device causes a portion of the specified data that failed to write to the individual cache block to be written to the additional cache block. Additionally, at operation 316, the processing device causes stored data in the additional cache block to be written to a non-cache block of the select set of non-cache blocks. For some embodiments, operation 316 comprises causing stored data in the additional cache block to be written to the non-cache block with padding. Operation 316 can represent a SLC-to-QLC data migration process.

Eventually, at operation 318, the processing device (e.g., the processor 117 of the memory sub-system controller 115) causes the individual cache block to be marked as bad (e.g., GBB) and, at operation 320, the processing device causes the individual cache block to be removed from the select set of cache blocks of the select zone (e.g., the individual cache block is released from the select zone). After causing the individual cache block to be marked as bad, the individual cache block can be retired from use. Additionally, after causing the individual cache block to be marked as bad, at operation 322, the processing device determines whether a select set of memory die planes of the memory device that includes the individual cache block satisfies a condition that indicates a shortage of cache block capacity of the memory device (e.g., number of available cache blocks are below a threshold number). At decision block 324, in response to determining that the select set of memory die planes of the memory device satisfies the condition, the method 300 proceeds to operation 326, where the processing device retires the select set of memory die planes. In retiring the select set of memory die planes, cache blocks from the select set of memory die planes can be prevented from being allocated for use. Alternatively, at decision block 324, in response to determining that the select set of memory die planes of the memory device does not satisfy the condition, the method 300 does nothing.

Figure 4:
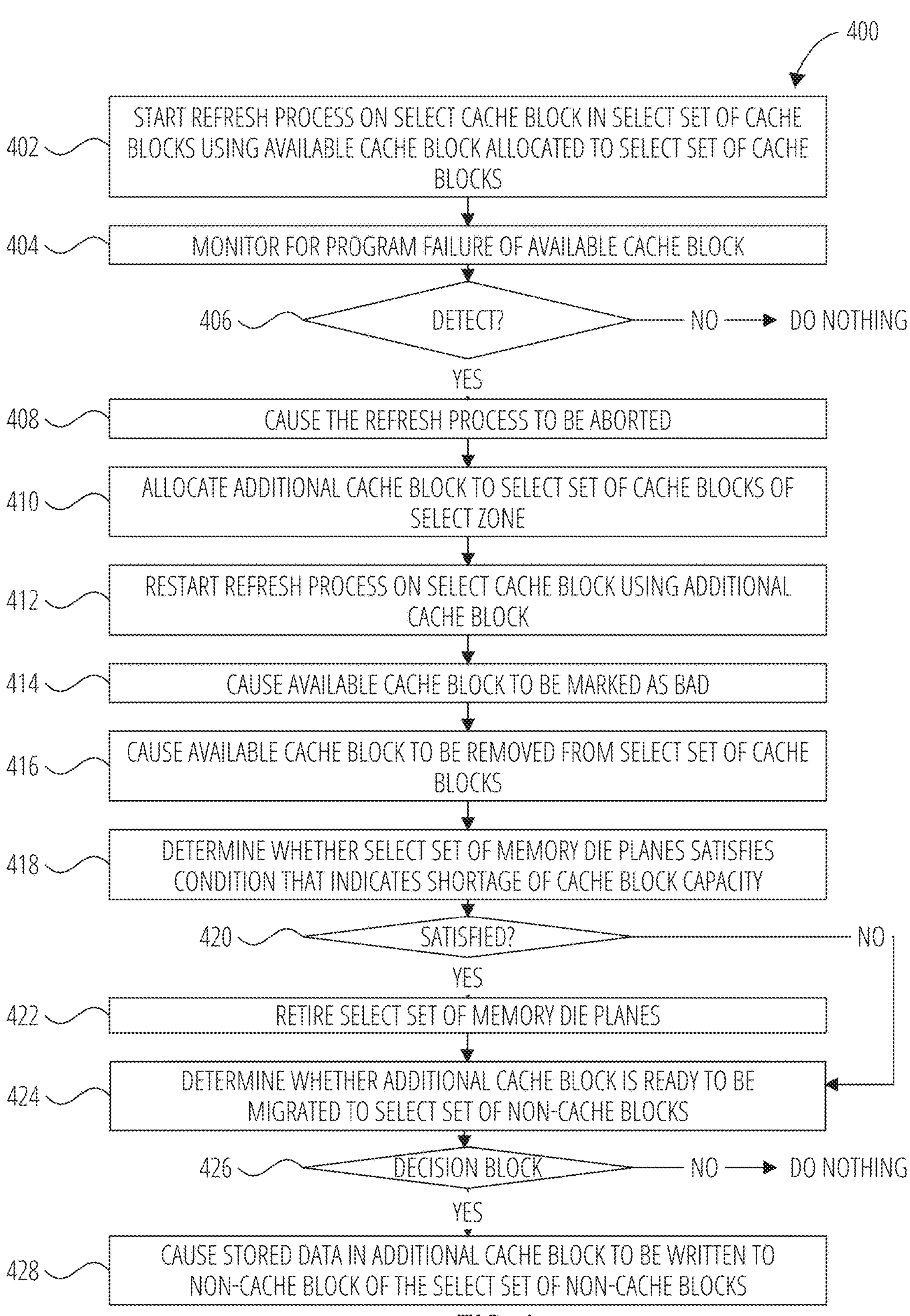

Referring now to FIG. 4, the method 400 illustrates an example method for handling block program failure during refresh of a cache block (e.g., SLC cache block refresh) of a zone on a memory sub-system that supports zones. At operation 402, a processing device (e.g., the processor 117 of the memory sub-system controller 115) starts a refresh process on a select cache block in a select set of cache blocks using an available cache block allocated to the select set of cache blocks, where a memory device (e.g., memory device 130) comprises a set of zones for storing data, and the select zone (of the set of zones) comprises the select set of cache blocks and a select set of non-cache blocks. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to a NVMe specification. Depending on the embodiment, the refresh process can be started (e.g., triggered) on the select cache block as part of a wear leveling process, a garbage collection process, a media scan process, a read disturb process, or another background process being performed on the select cache block.

While the refresh process is being performed, at operation 404, the processing device (e.g., the processor 117 of the memory sub-system controller 115) monitors (e.g., detects) for a program failure (e.g., a PF status) of the available cache block. At decision block 406, in response to the program failure being detected by operation 404, the method 400 proceeds to operation 408. Alternatively, at decision block 406, in response to the program failure not being detected by operation 404, the method 400 does nothing and the refresh process is assumed to have been completed without program failure.

At operation 408, the processing device (e.g., the processor 117 of the memory sub-system controller 115) causes the refresh process to be aborted. At operation 410, the processing device allocates a new, additional cache block to the select set of cache blocks of the select zone. Where select cache block is allocated from a select set of memory die planes of the memory device, the additional cache block can be allocated from the same select set of memory die planes. Thereafter, at operation 412, the processing device restarts the refresh process on the select cache block using the additional cache block (allocated by operation 410).

Eventually, at operation 414, the processing device (e.g., the processor 117 of the memory sub-system controller 115) causes the available cache block to be marked as bad (e.g., GBB) and, at operation 416, the processing device causes the available cache block to be removed from the select set of cache blocks of the select zone (e.g., the available cache block is released from the select zone). By operations 414 and 416, some embodiments effectively render the available cache block unavailable for subsequent use. After causing the available cache block to be marked as bad, the available cache block can be retired from use. Additionally, after causing the available cache block to be marked as bad, at operation 418, the processing device determines whether the select set of memory die planes satisfies a condition that indicates a shortage of cache block capacity of the memory device (e.g., number of available cache blocks are below a threshold number). At decision block 420, in response to determining that the select set of memory die planes of the memory device satisfies the condition, the method 400 proceeds to operation 422, where the processing device retires the select set of memory die planes. In retiring the select set of memory die planes, cache blocks from the select set of memory die planes can be prevented from being allocated for use. After operation 422, the method 400 proceeds to operation 424. Alternatively, at decision block 420, in response to determining that the select set of memory die planes of the memory device does not satisfy the condition, the method 400 does nothing with respect to the select set of memory die planes and proceeds to operation 424.

During operation 422, the processing device (e.g., the processor 117 of the memory sub-system controller 115) determines whether the additional cache block is ready to be migrated to the select set of non-cache blocks. For instance, during operation 422, the processing device can determine whether the additional cache block is full or considered full, and determine that the additional cache block is ready to be migrated in response to determining that the additional cache block is full or considered full. At decision block 426, in response to determining that the additional cache block is ready to be migrated to the select set of non-cache blocks, the method 400 proceeds to operation 428, where the processing device causes stored data in the additional cache block to be written to a non-cache block of the select set of non-cache blocks of the select zone. Alternatively, at decision block 426, in response to determining that the additional cache block is not ready to be migrated to the select set of non-cache blocks, the method 400 does nothing.

Figure 5:
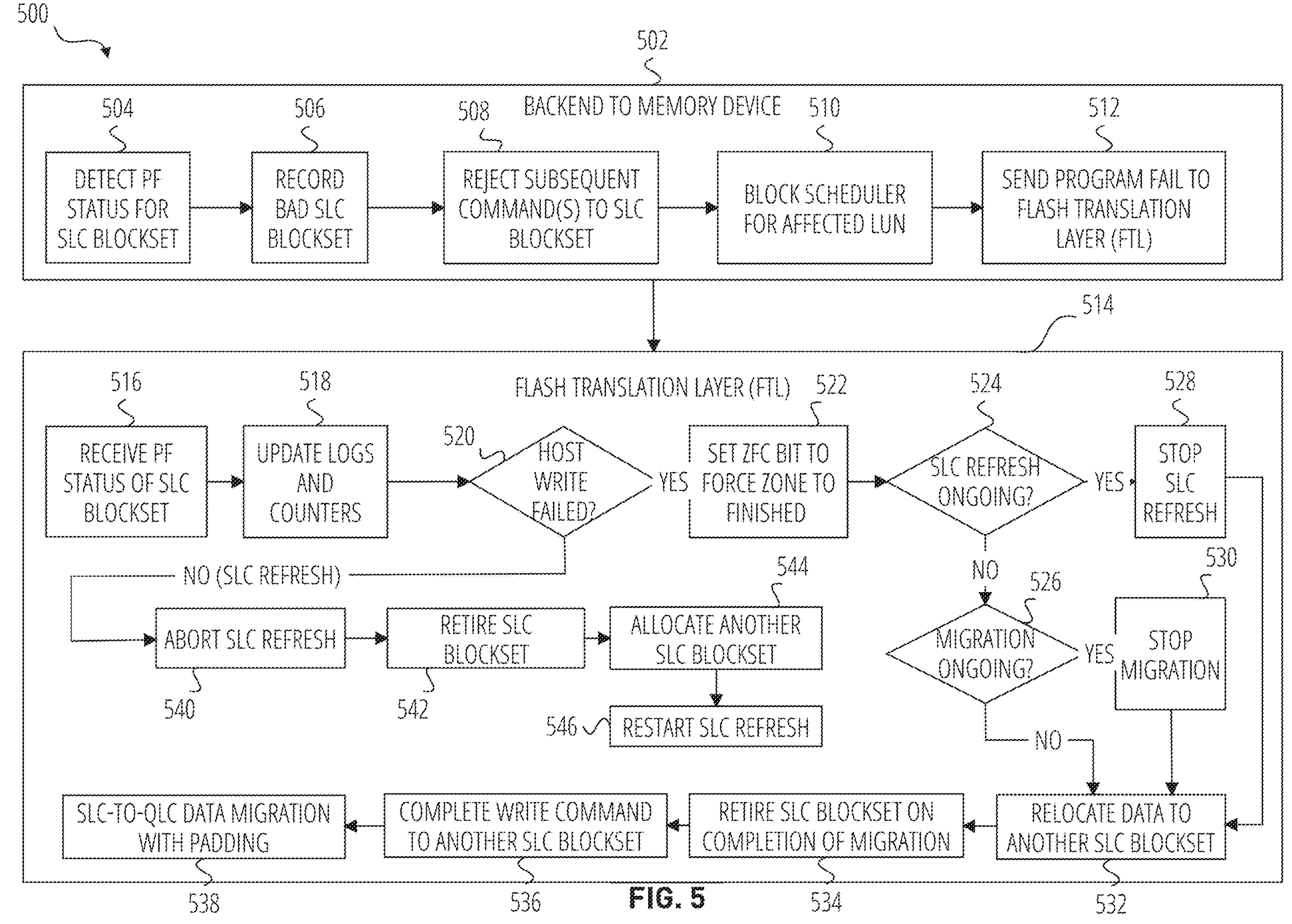

Referring now to FIG. 5, the method 500 illustrates an example implementation of methods 300, 400 with respect to SLC cache blocks and QLC non-cache blocks of a memory sub-system that supports zones. As shown, the method 500 is implemented with respect to a backend to memory device 502 of a memory sub-system (e.g., 110) and a flash translation layer (FTL) 514 of the memory sub-system. The backend to memory device 502 detects a program failure (PF) status for a SLC blockset (at operation 504), records the SLC blockset (at operation 506), begins to reject one or more subsequent commands to the SLC blockset (at operation 508), blocks the scheduler for the logical unit (LUN) associated with the SLC blockset (at operation 510), and sends a PF status of the SLC blockset to the FTL 514 (at operation 512).

The FTL 514 receives the PF status for the SLC blockset from the backend to memory device 502 (at operation 516), and updates logs and counters based on the PF status (at operation 518). The FTL 514 determines whether PF status is associated with a host write fail (at decision block 520). If the PF status is associated with a failed host write, the method 500 proceeds to operation 522, otherwise the method 500 proceeds to operation 540, where the PF status is assumed to be associated with an SLC refresh (and not a failed host write).

At operation 522, the FTL 514 sets the ZFC bit to force a zone associated with the SLC blockset to be finished. At decision block 524, the FTL 514 determines whether an SLC refresh process is ongoing. If an SLC refresh process is ongoing, the method 500 proceeds to operation 528, where the SLC refresh process is stopped and the method 500 proceeds to operation 532. If an SLC refresh process is not ongoing, the method 500 proceeds to decision block 526, where the FTL 514 determines whether a data migration process is ongoing. If a data migration process is ongoing, the method 500 proceeds to operation 530, where the data migration process is stopped and the method 500 proceeds to operation 532. If a data migration process is not ongoing, the method 500 proceeds to operation 532.

During operation 532, the FTL 514 relocates data from the SLC blockset to another (new) SLC blockset by way of a data migration process. The FTL 514 retires the SLC blockset on completion of the data migration (at operation 534), completes the failed host write to the other (new) SLC blockset (at operation 536), and performs an SLC-to-QLC data migration from the other (new) SLC blockset to a QLC blockset with data padding (at operation 538).

At operation 540, the PF status is not associated with a failed host write, the PF status is associated with a SLC refresh, and the FTL 514 aborts the SLC refresh involving the SLC blockset. The FTL 514 retires the SLC blockset (at operation 542), allocates another (new) SLC blockset (at operation 544), and restarts the SLC refresh using the other (new) SLC blockset (at operation 546).

Figure 6:
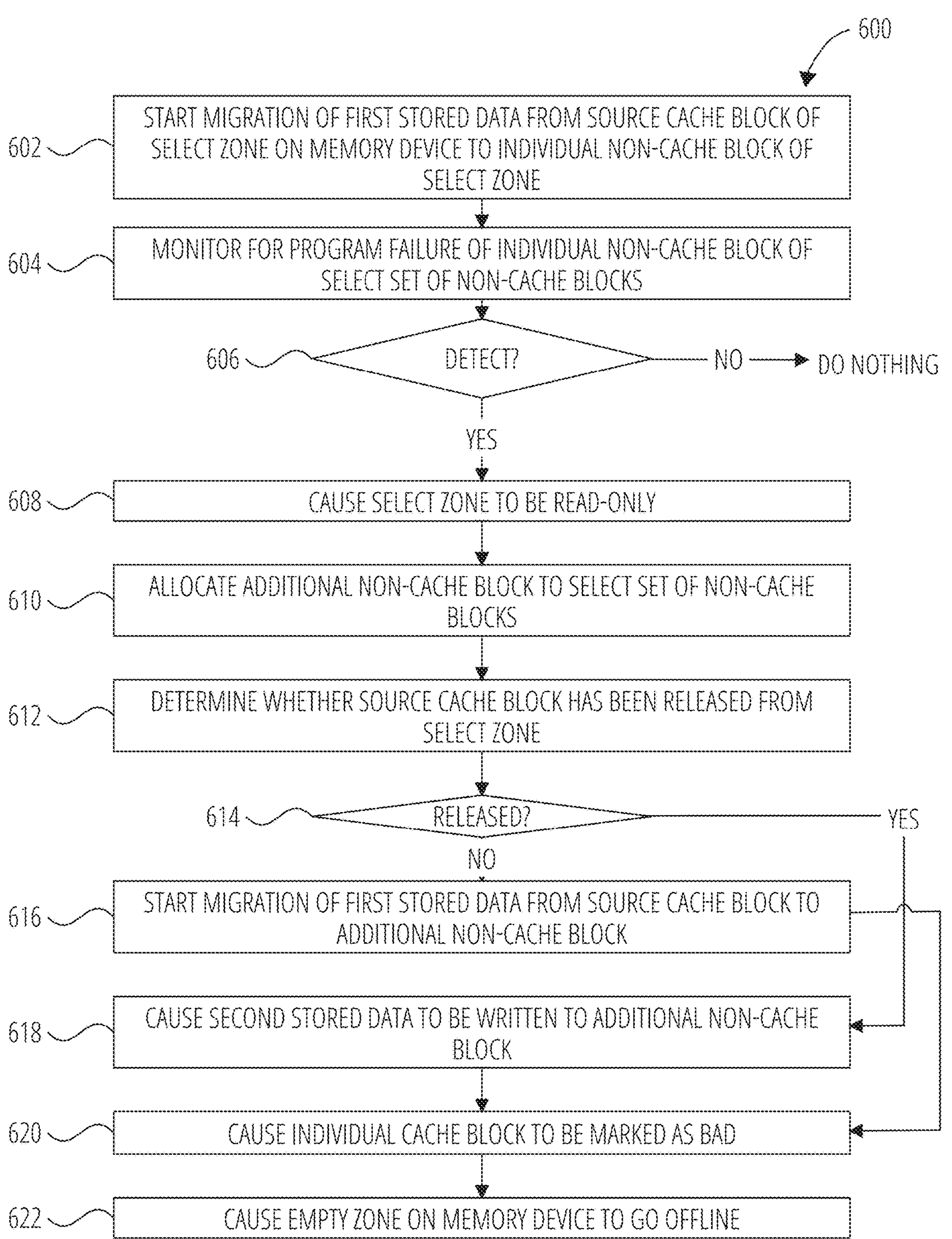

Referring now to FIG. 6, the method 600 illustrates an example method for handling block program failure during migration of data between a cache block and a non-cache block of a zone (e.g., SLC cache block and QLC non-cache block) on a memory sub-system that supports zones. At operation 602, a processing device (e.g., the processor 117 of the memory sub-system controller 115) starts migration of first stored data, from a source cache block of a select set of cache blocks of a select zone on a memory device (e.g., memory device 130), to an individual non-cache block of a select set of non-cache blocks of the select zone. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to a NVMe specification.

While the migration is being performed, at operation 604, the processing device (e.g., the processor 117 of the memory sub-system controller 115) monitors (e.g., detects) for a program failure (e.g., PF status) of an individual non-cache block of the select set of non-cache blocks of the select zone. At decision block 606, in response to the program failure being detected by operation 604, the method 600 proceeds to operation 608. Alternatively, at decision block 606, in response to the program failure not being detected by operation 604, the method 600 does nothing and the migration of data is assumed to have been completed without program failure.

At operation 608, the processing device (e.g., the processor 117 of the memory sub-system controller 115) causes the select zone to be read-only. While the select zone is in read-only, data is prevented from being written to the select zone but ensures stored data in the select zone remains readable. At operation 610, the processing device allocates a new, additional non-cache block to the select set of non-cache blocks of the select zone. Where individual non-cache block is allocated from a select set of memory die planes of the memory device, the additional non-cache block can be allocated from the same select set of memory die planes. Then, at operation 612, the processing device determines whether the source cache block has been released from the select zone. At decision block 614, in response to determining that the source cache block has not been released from the select zone, the method 600 proceeds to operation 616, where the processing device starts migration of the first stored data from the source cache block to the additional non-cache block (allocated by operation 610). Alternatively, at decision block 614, in response to determining that the source cache block has been released from the select zone, the method 600 proceeds to operation 618, where the processing device causes second stored data in the individual non-cache block to be written to the additional non-cache block (allocated by operation 610). After operation 616 or operation 618, the method 600 proceeds to operation 620.

During operation 620, the processing device (e.g., the processor 117 of the memory sub-system controller 115) causes the individual non-cache block to be marked as bad (e.g., GBB). After causing the individual non-cache block to be marked as bad, the individual non-cache block can be retired from use. Additionally, after the causing of the individual non-cache block to be marked as bad, at operation 622, the processing device causes an empty zone on the memory device to go offline. By taking an empty zone offline, various embodiments can compensate for capacity loss due to block retirement of the available non-cache block.

Figure 7:
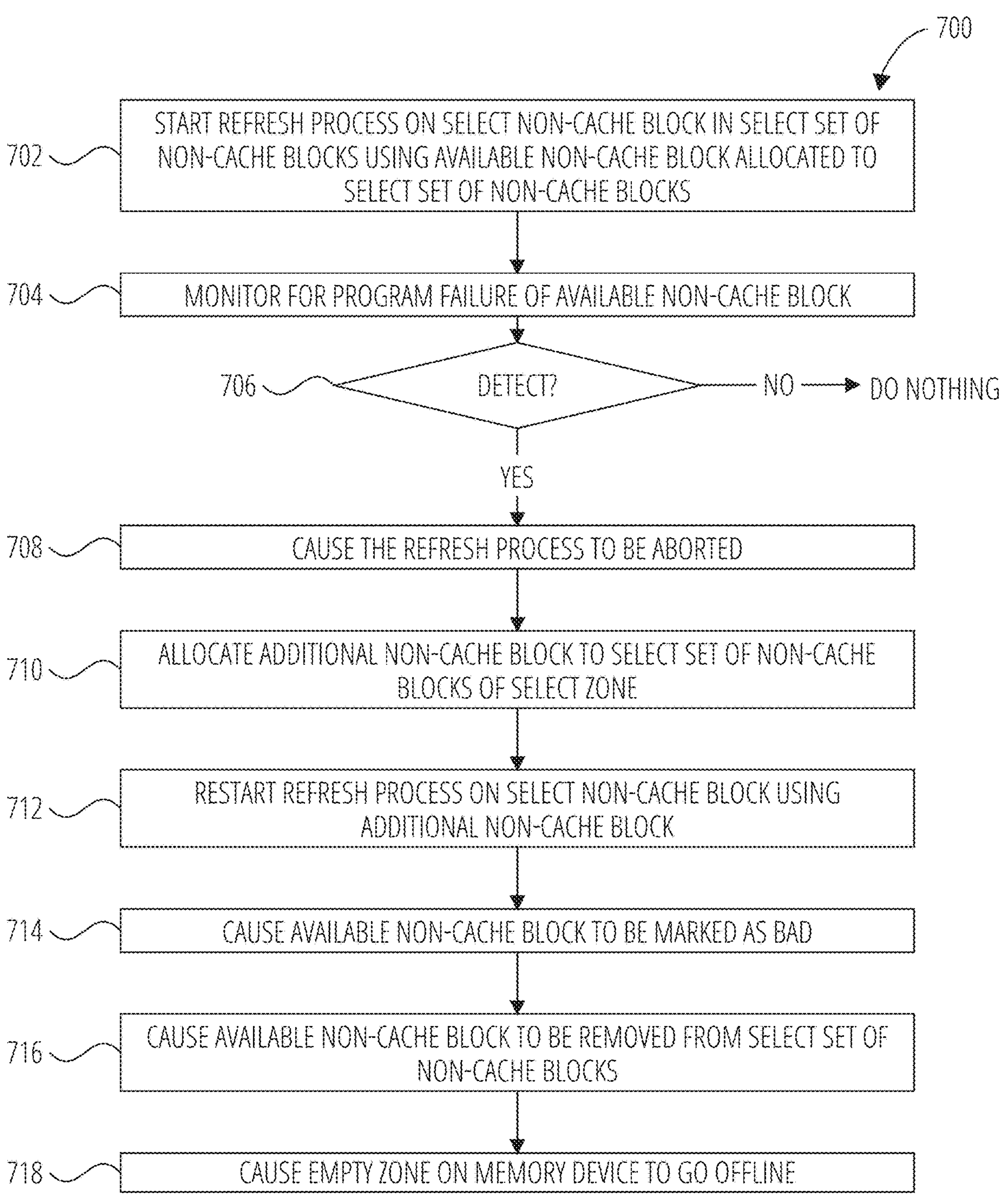

Referring now to FIG. 7, the method 700 illustrates an example method for handling block program failure during refresh of a non-cache block (e.g., QLC non-cache block) of a zone on a memory sub-system that supports zones.

At operation 702, a processing device (e.g., the processor 117 of the memory sub-system controller 115) starts a refresh process on a select non-cache block in a select set of non-cache blocks using an available non-cache block allocated to the select set of non-cache blocks, where a memory device (e.g., memory device 130) comprises a set of zones for storing data, and the select zone (of the set of zones) comprises a select set of cache blocks and the select set of non-cache blocks. For example, the select set of cache blocks can comprise one or more SLC cache blocks, such as one or more SLC blocksets, and the select set of non-cache blocks can comprise one or more QLC non-cache blocks, such as a single QLC blockset. The set of zones can be defined according to a NVMe specification. Depending on the embodiment, the refresh process can be started (e.g., triggered) on the select non-cache block as part of a wear leveling process, a garbage collection process, a media scan process, a read disturb process, or another background process being performed on the select non-cache block.

While the refresh process is being performed, at operation 704, the processing device (e.g., the processor 117 of the memory sub-system controller 115) monitors (e.g., detects) for a program failure (e.g., PF status) of the available non-cache block. At decision block 706, in response to the program failure being detected by operation 704, the method 700 proceeds to operation 708. Alternatively, at decision block 706, in response to the program failure not being detected by operation 704, the method 700 does nothing and the refresh process is assumed to have been completed without program failure.

At operation 708, the processing device (e.g., the processor 117 of the memory sub-system controller 115) causes the refresh process to be aborted. At operation 710, the processing device allocates a new, additional non-cache block to the select set of non-cache blocks of the select zone. Where select non-cache block is allocated from a select set of memory die planes of the memory device, the additional non-cache block can be allocated from the same select set of memory die planes. Thereafter, at operation 712, the processing device restarts the refresh process on the select non-cache block using the additional non-cache block (allocated by operation 710).

Eventually, at operation 714, the processing device (e.g., the processor 117 of the memory sub-system controller 115) causes the available non-cache block to be marked as bad (e.g., GBB) and, at operation 716, the processing device causes the available non-cache block to be removed from the select set of non-cache blocks of the select zone (e.g., the available cache block is released from the select zone). By operations 714 and 716, some embodiments effectively render the available non-cache block unavailable for subsequent use. After causing the available cache block to be marked as bad, the available non-cache block can be retired from use. Additionally, after causing the available non-cache block to be marked as bad, at operation 718, the processing device causes an empty zone on the memory device to go offline. By taking an empty zone offline, operation 718 can compensate for capacity loss due to block retirement of the available non-cache block.

Figure 8:
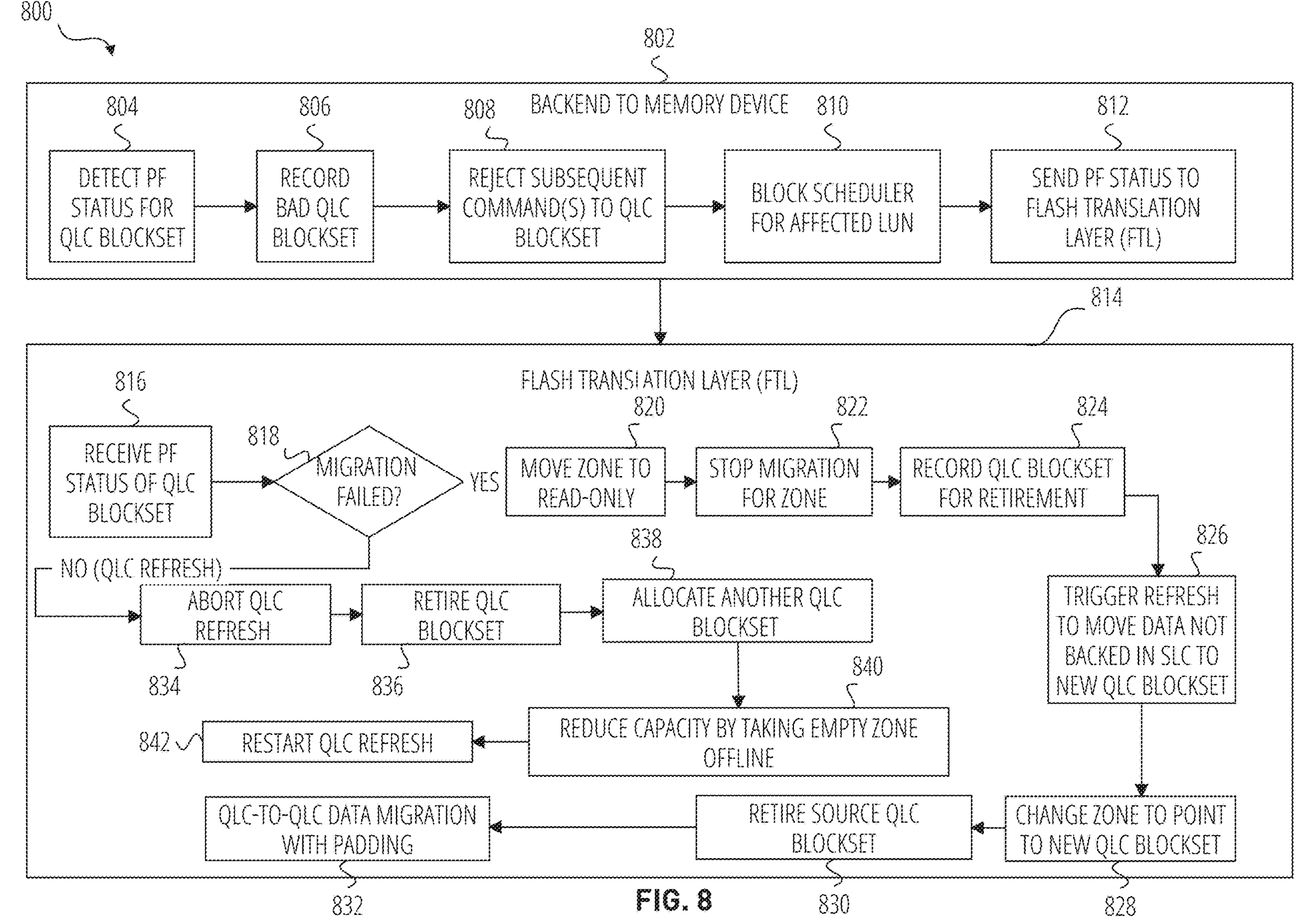

Referring now to FIG. 8, the method 800 illustrates an example implementation of methods 600, 700 with respect to SLC cache blocks and QLC non-cache blocks of a memory sub-system that supports zones. As shown, the method 800 is implemented with respect to a backend to memory device 802 of a memory sub-system (e.g., 110) and a flash translation layer (FTL) 814 of the memory sub-system. The backend to memory device 802 detects a program failure (PF) status for a QLC blockset (at operation 804), records the QLC blockset (at operation 806), begins to reject one or more subsequent commands to the QLC blockset (at operation 808), blocks the scheduler for the logical unit (LUN) associated with the QLC blockset (at operation 810), and sends a PF status of the QLC blockset to the FTL 814 (at operation 812).

The FTL 814 receives the PF status for the QLC blockset from the backend to memory device 802 (at operation 816). The FTL 814 determines whether PF status is associated with a data migration fail (at decision block 818). If the PF status is associated with a failed data migration, the method 800 proceeds to operation 820, otherwise the method 800 proceeds to operation 834, where the PF status is assumed to be associated with an QLC refresh (and not a failed data migration).

The FTL 814 moves a zone associated with the QLC blockset to be read-only (at operation 820), stops the data migration for the zone (at operation 822), and records the QLC blockset for retirement (at operation 824). At operation 826, the FTL 814 triggers a refresh to move data not backed in a SLC blockset to a new QLC blockset. At operation 828, the FTL 814 changes the zone to point to the new QLC blockset. The FTL 814 retires the source QLC blockset (at operation 830) and performs an QLC-to-QLC data migration from the QLC blockset to the new QLC blockset with data padding (at operation 832).

At operation 834, the PF status is not associated with a failed data migration, the PF status is associated with a QLC refresh, and the FTL 814 aborts the QLC refresh involving the QLC blockset. The FTL 814 retires the QLC blockset (at operation 836), allocates another (new) QLC blockset (at operation 838), reduces capacity of the memory sub-system by taking an empty zone offline (at operation 840), and restarts the QLC refresh using the other (new) QLC blockset (at operation 842).

Figure 9:
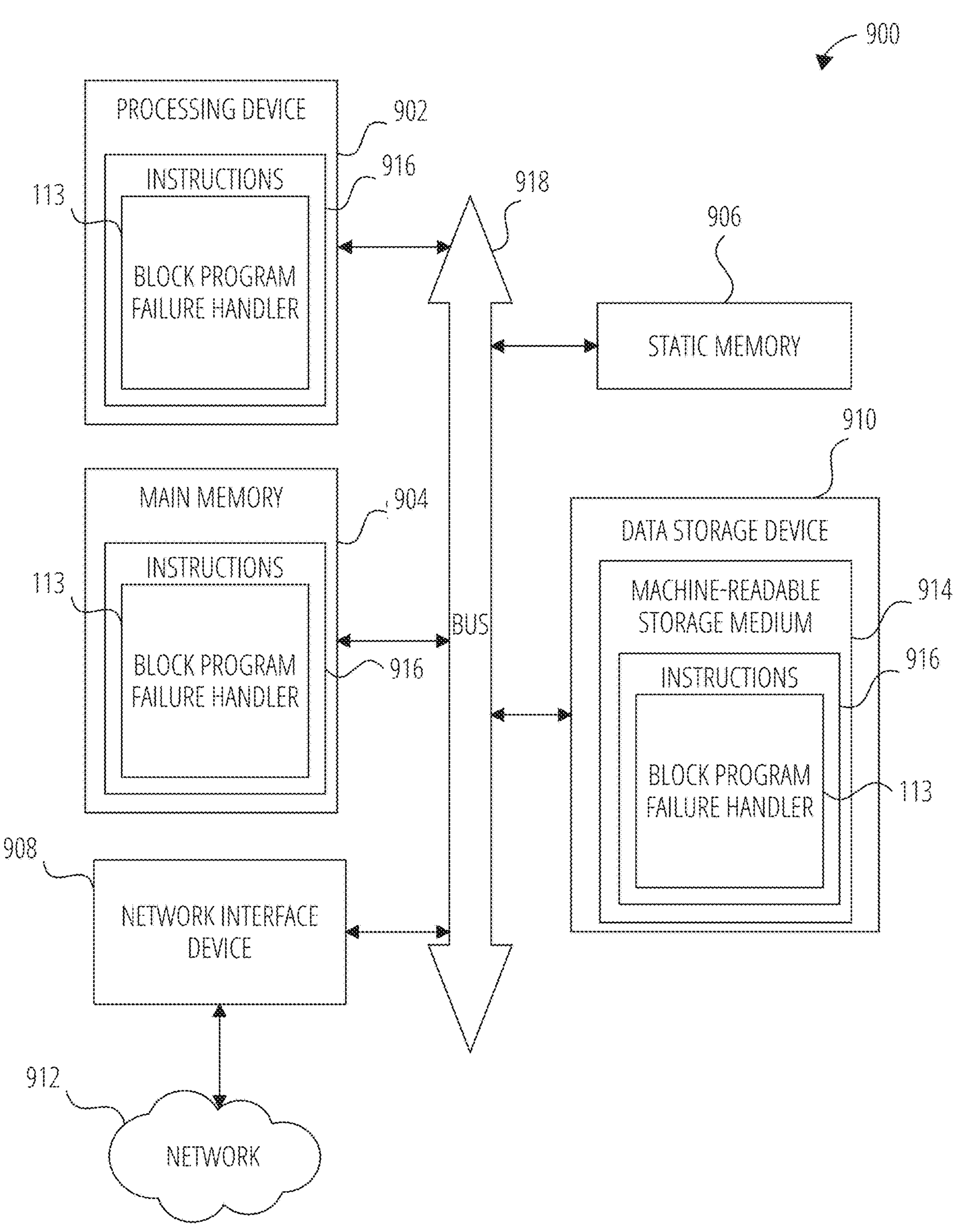
FIG. 9 is a block diagram of an example computer system in which embodiments of the present disclosure may operate.

FIG. 9 illustrates an example machine in the form of a computer system 900 within which a set of instructions can be executed for causing the machine to perform any one or more of the methodologies discussed herein. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., ROM, flash memory, DRAM such as SDRAM or Rambus DRAM (RDRAM), etc.), a static memory 906 (e.g., flash memory, static random access memory (SRAM), etc.), and a data storage device 910, which communicate with each other via a bus 918.

The processing device 902 represents one or more general-purpose processing devices such as a microprocessor, a central processing unit, or the like. More particularly, the processing device 902 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 902 can also be one or more special-purpose processing devices such as an application-specific integrated circuit (ASIC), a field programmable gate array (FPGA), a digital signal processor (DSP), a network processor, or the like. The processing device 902 is configured to execute instructions 916 for performing the operations and steps discussed herein. The computer system 900 can further include a network interface device 908 to communicate over a network 912.

The data storage device 910 can include a machine-readable storage medium 914 (also known as a computer-readable medium) on which is stored one or more sets of instructions 916 or software embodying any one or more of the methodologies or functions described herein. The instructions 916 can also reside, completely or at least partially, within the main memory 904 and/or within the processing device 902 during execution thereof by the computer system 900, the main memory 904 and the processing device 902 also constituting machine-readable storage media. The machine-readable storage medium 914, data storage device 910, and/or main memory 904 can correspond to the memory sub-system 110 of FIG. 1.

In one embodiment, the instructions 916 include instructions to implement functionality corresponding to providing block failure protection for a zone memory sub-system as described herein (e.g., the block program failure handler 113 of FIG. 1). While the machine-readable storage medium 914 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device comprising a set of zones for storing data, a select zone of the set of zones comprising a select set of cache blocks and a select set of non-cache blocks; and a processing device, operatively coupled to the memory device, configured to perform operations comprising: starting write of specified data to the memory device; and while the specified data is being written to the select zone: monitoring for a program failure of an individual cache block of the select set of cache blocks; and in response to detecting the program failure of the individual cache block: causing the select zone to be marked as finished; allocating an additional cache block to the select set of cache blocks; causing stored data in the individual cache block to be written to the additional cache block; and causing a portion of the specified data that failed to write to the individual cache block to be written to the additional cache block.

In Example 2, the subject matter of Example 1 includes, wherein the causing of the stored data in the individual cache block to be written to the additional cache block: determining whether a refresh process is being performed on at least one cache block of the select set of cache blocks; and in response to determining that the refresh process is being performed on at least one cache block of the select set of cache blocks, causing the refresh process to stop.

In Example 3, the subject matter of Examples 1-2 includes, wherein the causing of the stored data in the individual cache block to be written to the additional cache block: determining whether a data migration is being performed from at least one cache block of the select set of cache blocks to at least one non-cache block of the select set of non-cache blocks; and in response to determining that the data migration is being performed from at least one cache block of the select set of cache blocks to at least one non-cache block of the select set of non-cache blocks, causing the data migration to stop.

In Example 4, the subject matter of Examples 1-3 includes, wherein the operations comprise: in response to detecting the program failure of the individual cache block, after the causing of the portion of the specified data to be written to the additional cache block: causing stored data in the additional cache block to be written to a non-cache block of the select set of non-cache blocks.

In Example 5, the subject matter of Examples 1~4 includes, wherein the individual cache block is from a select set of memory die planes of the memory device, and wherein the additional cache block is allocated from the select set of memory die planes.

In Example 6, the subject matter of Examples 1-5 includes, wherein the operations comprise: in response to detecting that the program failure of the individual cache block: causing the individual cache block to be marked as bad; and causing the individual cache block to be removed from the select set of cache blocks.

In Example 7, the subject matter of Example 6 includes, wherein the individual cache block is from a select set of memory die planes of the memory device, and wherein the operations comprise: in response to detecting the program failure of the individual cache block, after the causing of the individual cache block to be marked as bad: determining whether the select set of memory die planes satisfies a condition that indicates a shortage of cache block capacity of the memory device; and in response to determining that the memory device satisfies a condition that indicates the shortage of cache block capacity of the memory device, retiring the select set of memory die planes.

In Example 8, the subject matter of Examples 1-7 includes, wherein the program failure is a first program failure, and wherein the operations comprise: starting a refresh process on another cache block in the select set of cache blocks using a first available cache block allocated to the select set of cache blocks; and while the refresh process is being performed: detecting for a second program failure of the first available cache block; and in response to detecting the second program failure of the first available cache block: causing the refresh process to be aborted; allocating a second available cache block to the select set of cache blocks; and restarting the refresh process on the other cache block using the second available cache block.

In Example 9, the subject matter of Example 8 includes, wherein the first available cache block is from a select set of memory die planes of the memory device, and wherein the second available cache block is allocated from the select set of memory die planes.

In Example 10, the subject matter of Examples 8-9 includes, wherein the operations comprise: in response to detecting the second program failure of the first available cache block: causing the first available cache block to be marked as bad; and causing the first available cache block to be removed from the select set of cache blocks.

In Example 11, the subject matter of Example 10 includes, wherein the first available cache block is from a select set of memory die planes of the memory device, and wherein the operations comprise: in response to detecting the second program failure of the first available cache block, after the causing of the first available cache block to be marked as bad: determining whether the select set of memory die planes satisfies a condition that indicates a shortage of cache block capacity of the memory device; and in response to determining that the memory device satisfies a condition that indicates the shortage of cache block capacity of the memory device, retiring the select set of memory die planes.

In Example 12, the subject matter of Examples 8-11 includes, wherein the operations comprise: in response to detecting the second program failure of the first available cache block: determining whether the second available cache block is ready to be migrated to the select set of non-cache blocks; and in response to determining that the second available cache block is ready to be migrated, causing stored data in the second available cache block to be written to a non-cache block of the select set of non-cache blocks.

In Example 13, the subject matter of Examples 1-12 includes, wherein the select set of cache blocks comprises one or more single-level cell (SLC) blocks.

In Example 14, the subject matter of Examples 1-13 includes, wherein the select set of non-cache blocks comprises one or more quad-level cell (QLC) blocks.

Example 15 is at least one non-transitory machine-readable storage medium comprising instructions that, when executed by a processing device, cause the processing device to perform operations comprising: starting migration of first stored data, from a source cache block of a select set of cache blocks of a select zone on a memory device, to an individual non-cache block of a select set of non-cache blocks of the select zone; and while the migration is being performed: monitoring for a program failure of the individual non-cache block; and in response to detecting the program failure of the individual non-cache block: causing the select zone to be read-only; allocating an additional non-cache block to the select set of non-cache blocks; determining whether the source cache block has been released from the select zone; in response to determining that the source cache block has not been released from the select zone, starting migration of the first stored data from the source cache block to the additional non-cache block; and in response to determining the source cache block has been released from the select zone, causing second stored data in the individual non-cache block to be written to the additional non-cache block.

In Example 16, the subject matter of Example 15 includes, wherein the operations comprise: in response to detecting the program failure of the individual non-cache block, causing the individual non-cache block to be marked as bad.

In Example 17, the subject matter of Example 16 includes, wherein the operations comprise: in response to detecting the program failure of the individual non-cache block, after the causing of the individual non-cache block to be marked as bad: causing an empty zone on the memory device to go offline.

In Example 18, the subject matter of Examples 15-17 includes, wherein the program failure is a first program failure, and wherein the operations comprise: starting a refresh process on another non-cache block in the select set of non-cache blocks using a first available non-cache block allocated to the select set of cache blocks; and while the refresh process is being performed: detecting for a second program failure of the first available non-cache block; and in response to detecting the second program failure of the available non-cache block: causing the refresh process to be aborted; allocating a second available non-cache block to the select set of non-cache blocks; and restarting the refresh process on the other non-cache block using the second available non-cache block.

In Example 19, the subject matter of Example 18 includes, wherein the operations comprise: in response to detecting the second program failure of the first available non-cache block: causing the first available non-cache block to be marked as bad; and causing an empty zone on the memory device to go offline.

Example 20 is a method to implement any of Examples 1-14.

Example 21 is at least one machine-readable medium comprising instructions that, when executed by a processing device, cause the processing device to perform operations to implement any of Examples 1-14.

Example 22 is a method to implement any of Examples 15-19.

Example 23 is a system to implement any of Examples 15-19.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMS, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A system comprising:

a memory device comprising a set of zones for storing data, a select zone of the set of zones comprising a select set of cache blocks and a select set of non-cache blocks; and a processing device, operatively coupled to the memory device, configured to perform operations comprising:

starting write of specified data to the memory device; and while the specified data is being written to the select zone:

monitoring for a program failure of an individual cache block of the select set of cache blocks; and in response to detecting the program failure of the individual cache block:

causing the select zone to be marked as finished;

allocating an additional cache block to the select set of cache blocks;

causing stored data in the individual cache block to be written to the additional cache block; and causing a portion of the specified data that failed to write to the individual cache block to be written to the additional cache block.

2. The system of claim 1, wherein the causing of the stored data in the individual cache block to be written to the additional cache block:

determining whether a refresh process is being performed on at least one cache block of the select set of cache blocks; and in response to determining that the refresh process is being performed on at least one cache block of the select set of cache blocks, causing the refresh process to stop.

3. The system of claim 1, wherein the causing of the stored data in the individual cache block to be written to the additional cache block:

determining whether a data migration is being performed from at least one cache block of the select set of cache blocks to at least one non-cache block of the select set of non-cache blocks; and in response to determining that the data migration is being performed from at least one cache block of the select set of cache blocks to at least one non-cache block of the select set of non-cache blocks, causing the data migration to stop.

4. The system of claim 1, wherein the operations comprise:

in response to detecting the program failure of the individual cache block, after the causing of the portion of the specified data to be written to the additional cache block:

causing stored data in the additional cache block to be written to a non-cache block of the select set of non-cache blocks.

5. The system of claim 1, wherein the individual cache block is from a select set of memory die planes of the memory device, and wherein the additional cache block is allocated from the select set of memory die planes.

6. The system of claim 1, wherein the operations comprise:

in response to detecting that the program failure of the individual cache block:

causing the individual cache block to be marked as bad; and causing the individual cache block to be removed from the select set of cache blocks.

7. The system of claim 6, wherein the individual cache block is from a select set of memory die planes of the memory device, and wherein the operations comprise:

in response to detecting the program failure of the individual cache block, after the causing of the individual cache block to be marked as bad:

determining whether the select set of memory die planes satisfies a condition that indicates a shortage of cache block capacity of the memory device; and in response to determining that the memory device satisfies a condition that indicates the shortage of cache block capacity of the memory device, retiring the select set of memory die planes.

8. The system of claim 1, wherein the program failure is a first program failure, and wherein the operations comprise:

starting a refresh process on another cache block in the select set of cache blocks using a first available cache block allocated to the select set of cache blocks; and while the refresh process is being performed:

detecting for a second program failure of the first available cache block; and in response to detecting the second program failure of the first available cache block:

causing the refresh process to be aborted;

allocating a second available cache block to the select set of cache blocks; and restarting the refresh process on the other cache block using the second available cache block.

9. The system of claim 8, wherein the first available cache block is from a select set of memory die planes of the memory device, and wherein the second available cache block is allocated from the select set of memory die planes.

10. The system of claim 8, wherein the operations comprise:

in response to detecting the second program failure of the first available cache block:

causing the first available cache block to be marked as bad; and causing the first available cache block to be removed from the select set of cache blocks.

11. The system of claim 10, wherein the first available cache block is from a select set of memory die planes of the memory device, and wherein the operations comprise:

in response to detecting the second program failure of the first available cache block, after the causing of the first available cache block to be marked as bad:

determining whether the select set of memory die planes satisfies a condition that indicates a shortage of cache block capacity of the memory device; and in response to determining that the memory device satisfies a condition that indicates the shortage of cache block capacity of the memory device, retiring the select set of memory die planes.

12. The system of claim 8, wherein the operations comprise:

in response to detecting the second program failure of the first available cache block:

determining whether the second available cache block is ready to be migrated to the select set of non-cache blocks; and in response to determining that the second available cache block is ready to be migrated, causing stored data in the second available cache block to be written to a non-cache block of the select set of non-cache blocks.

13. The system of claim 1, wherein the select set of cache blocks comprises one or more single-level cell (SLC) blocks.

14. The system of claim 1, wherein the select set of non-cache blocks comprises one or more quad-level cell (QLC) blocks.

15. At least one non-transitory machine-readable storage medium comprising instructions that, when executed by a processing device, cause the processing device to perform operations comprising:

starting migration of first stored data, from a source cache block of a select set of cache blocks of a select zone on a memory device, to an individual non-cache block of a select set of non-cache blocks of the select zone; and while the migration is being performed:

monitoring for a program failure of the individual non-cache block; and in response to detecting the program failure of the individual non-cache block:

causing the select zone to be read-only;

allocating an additional non-cache block to the select set of non-cache blocks;

determining whether the source cache block has been released from the select zone;

in response to determining that the source cache block has not been released from the select zone, starting migration of the first stored data from the source cache block to the additional non-cache block; and in response to determining the source cache block has been released from the select zone, causing second stored data in the individual non-cache block to be written to the additional non-cache block.

16. The at least one non-transitory machine-readable storage medium of claim 15, wherein the operations comprise:

in response to detecting the program failure of the individual non-cache block, causing the individual non-cache block to be marked as bad.

17. The at least one non-transitory machine-readable storage medium of claim 16, wherein the operations comprise:

in response to detecting the program failure of the individual non-cache block, after the causing of the individual non-cache block to be marked as bad:

causing an empty zone on the memory device to go offline.

18. The at least one non-transitory machine-readable storage medium of claim 15, wherein the program failure is a first program failure, and wherein the operations comprise:

starting a refresh process on another non-cache block in the select set of non-cache blocks using a first available non-cache block allocated to the select set of cache blocks; and while the refresh process is being performed:

detecting for a second program failure of the first available non-cache block; and in response to detecting the second program failure of the available non-cache block:

causing the refresh process to be aborted;

allocating a second available non-cache block to the select set of non-cache blocks; and restarting the refresh process on the other non-cache block using the second available non-cache block.

19. The at least one non-transitory machine-readable storage medium of claim 18, wherein the operations comprise:

in response to detecting the second program failure of the first available non-cache block:

causing the first available non-cache block to be marked as bad; and causing an empty zone on the memory device to go offline.

20. A method comprising:

starting write of specified data to a memory device that comprises a set of zones for storing data, a select zone of the set of zones comprising a select set of cache blocks and a select set of non-cache blocks; and while the specified data is being written to the select zone:

monitoring, by a memory sub-system controller, for a program failure of an individual cache block of the select set of cache blocks; and in response to detecting the program failure of the individual cache block:

causing, by the memory sub-system controller, the select zone to be marked as finished;

allocating, by the memory sub-system controller, an additional cache block to the select set of cache blocks;

causing, by the memory sub-system controller, stored data in the individual cache block to be written to the additional cache block; and causing, by the memory sub-system controller, a portion of the specified data that failed to write to the individual cache block to be written to the additional cache block.

* * * * *